(12) United States Patent
Knoll

(10) Patent No.: US 6,203,033 B1
(45) Date of Patent: *Mar. 20, 2001

(54) BUCKET-TRANSPORT WHEELBARROW

(76) Inventor: Bryce Knoll, 1815 N. Edgemont St., Los Angeles, CA (US) 90027

( * ) Notice: Subject to any disclaimer, the term of this patent is extended or adjusted under 35 U.S.C. 154(b) by 0 days.

This patent is subject to a terminal disclaimer.

(21) Appl. No.: 09/271,539

(22) Filed: Mar. 18, 1999

(51) Int. Cl.⁷ .................................................. B62B 1/00
(52) U.S. Cl. ................... 280/47.3; 280/47.31; 280/653; 280/47.33; 280/47.26
(58) Field of Search ................ 280/653, 47.31, 280/79.5, 47.3, 47.32, 47.33, 47.19, 47.26

(56) References Cited

U.S. PATENT DOCUMENTS

| | | | |
|---|---|---|---|
| 1,479,223 | * | 1/1924 | Carroll ................................ 280/653 |
| 2,855,210 | * | 10/1958 | Joyce ................................ 280/47.33 |
| 3,704,025 | * | 11/1972 | Cerveney et al. . | |
| 5,149,125 | * | 9/1992 | Gray . | |
| 5,791,667 | * | 8/1998 | Knoll ........................... 280/47.31 X |

FOREIGN PATENT DOCUMENTS

0309440 * 12/1997 (JP) .

* cited by examiner

Primary Examiner—Brian L. Johnson
Assistant Examiner—Bryan Fischmann
(74) Attorney, Agent, or Firm—Erik M. Arnhem

(57) ABSTRACT

A wheelbarrow for transporting four circular buckets, includes a U-shaped bucket-support platform extending rearwardly from the wheelbarrow front wheel, and two bucket-confinement rings located above the platform. The rings are supported by a U-shaped support tube near the front wheel, and two vertical tubes on the wheelbarrow centerline. The buckets are supported near the wheelbarrow centerline to minimize any tendency of the wheelbarrow to tip over.

9 Claims, 2 Drawing Sheets

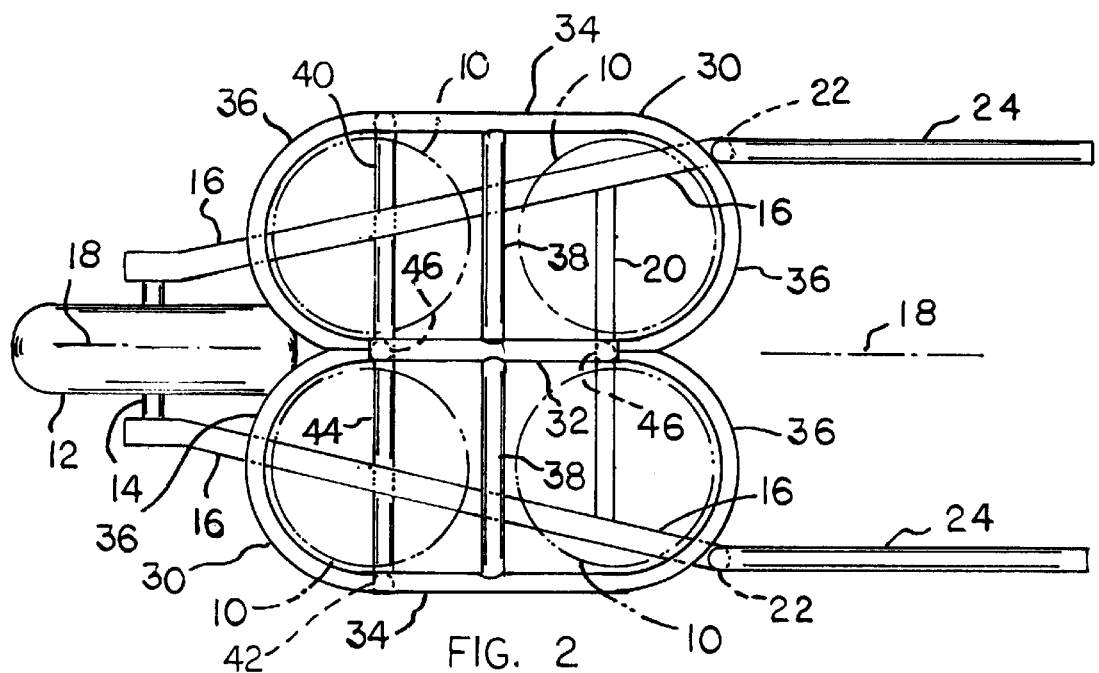
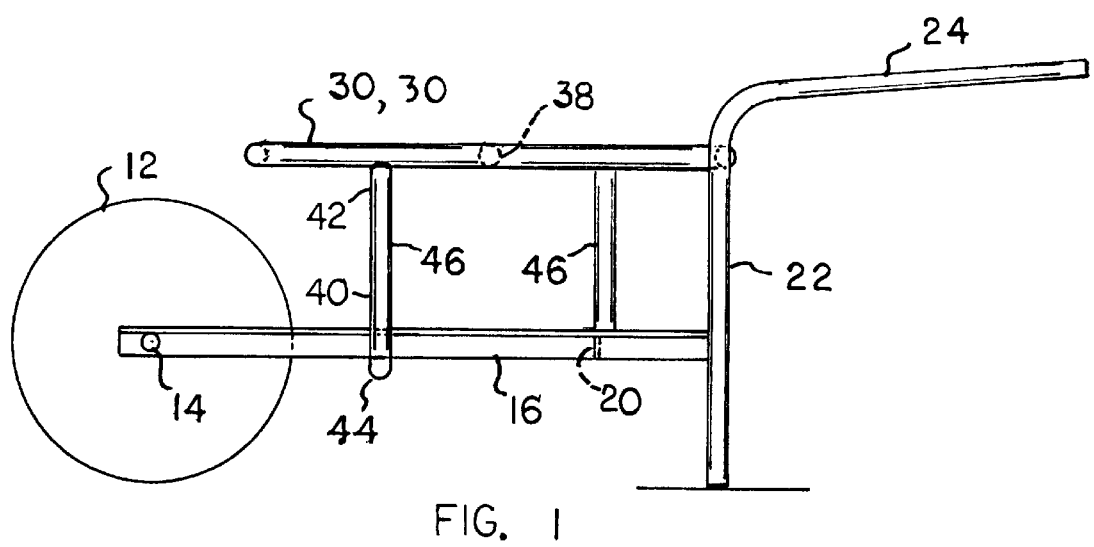

BUCKET-TRANSPORT WHEELBARROW

BACKGROUND AND SUMMARY OF THE INVENTION

This invention relates to a wheelbarrow for transporting circular (cylindrical) buckets. In many respects the present wheelbarrow is similar to a wheelbarrow depicted in my issued U.S. Pat. No. 5,791,667. The present wheelbarrow is considered to be an improvement on the wheelbarrow of U.S. Pat. No. 5,791,667, in that the buckets are positioned relatively close to the wheelbarrow longitudinal centerline, whereby the bucket load is more centrally supported, with less tendency of the wheelbarrow to tip over when it is being lifted and moved.

As with the wheelbarrow of U.S. Pat. No. 5,791,667, the present wheelbarrow is especially designed to transport circular buckets containing solid or liquid materials.

Conventional wheelbarrows are in some cases not fully effective for transporting bulk materials from one location to another location. For example, liquid materials tend to slosh and overflow the side edges of the wheelbarrow during the transport phase, especially if the wheelbarrow has to transverse bumpy or rough terrain. Also it is sometimes difficult to remove bulk materials from a conventional wheelbarrow, particularly when the unloading operation is to be performed in cramped or relatively inaccessible locations.

Also, the conventional wheelbarrow has a single dish-like compartment, so that only one material can be transported during any given trip; the conventional wheelbarrow does not permit different materials to be segregated and carried together from one location to another location in a single trip.

A further difficulty is that the conventional wheelbarrow cannot be readily cleaned without allowing the excess waste product to be dumped on the terrain; typically the wheelbarrow is cleaned by spraying water onto the wheelbarrow surface while the wheelbarrow is standing on end, such that waste products are caused to flow out of the wheelbarrow onto the ground. If the waste products are hazzardous there can be an environmental problem.

The present invention is directed to a wheelbarrow having a series of compartments or chambers adapted to removably receive standard size buckets. Typically each bucket is a five gallon cylindrical bucket having a height of about fourteen inches and a diameter of about eleven inches. Each bucket is tapered slightly from top to bottom to permit easy telescopic stacking of the empty buckets. Each bucket has a bail (handle) for bucket-lifting purposes.

The wheelbarrow has one or more bucket-retention mechanisms, that include a lower bucket-support platform and an upper bucket-confinement wall structure designed to prevent lateral shifting of the associated bucket while the wheelbarrow is moving from one location to another location. At the destination point each loaded bucket is lifted out of the specially designed wheelbarrow for storage, pouring or other disposition of the bulk material.

The wheelbarrow can be used in various different areas, e.g. by construction workers, warehouse personnel, gardeners, homeowners, farmers, and retail stores.

The wheelbarrow can be constructed in various different sizes, e.g. a relatively small wheelbarrow designed to carry two buckets, a medium sized wheelbarrow designed to carry four buckets or a large sized wheelbarrow designed to carry six buckets.

Further features of this invention will be apparent from the attached drawings and description of illustrative embodiments of the invention.

THE DRAWINGS

FIG. 1 is a side elevational view of of a wheelbarrow embodying the invention.

FIG. 2 is a top plan view of the FIG. 1 wheelbarrow.

DESCRIPTION OF A PREFERRED EMBODIMENT OF THE INVENTION

Figure 3:
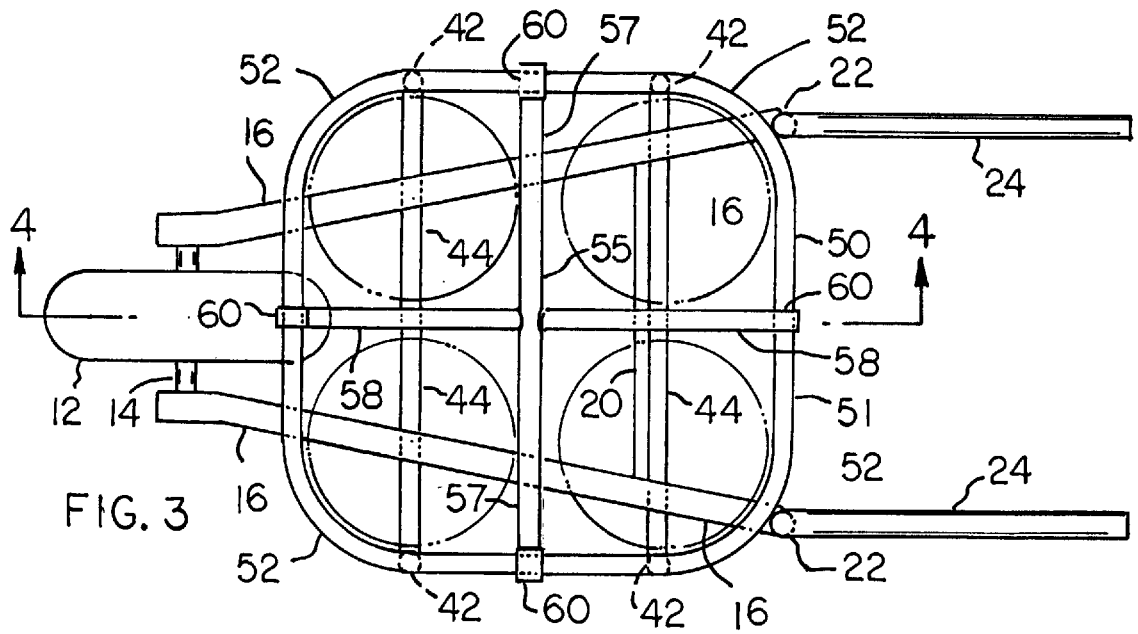
FIG. 3 is a top plan view of another wheelbarrow embodying the invention.

FIGS. 1 and 2 show a preferred embodiment of the invention. The drawings depict a wheelbarrow adapted to support four circular buckets, represented by numerals 10 in the drawings. Each bucket will be equpped with a bail (or handle) for lifting the bucket out of the wheelbarrow when the wheelbarrow has reached the destination point.

The wheelbarrow has a single ground wheel 12 that is equipped with an axle 14 journaled in bearings on the front ends of two divergent longitudinal rails 16. Rails 16 are located in a common horizontal plane when the wheelbarrow is at rest, as shown in FIG. 2, whereby the rails are adapted to support the four circular buckets 10.

As shown in FIG. 1, rails 16 diverge away from the wheelbarrow longitudinal centerline 18 in the front-to rear direction. A cross rail 20 connects rails 16 near their rear ends, such that the three rails 16, 16, 20 form a bucket support platform suitable for supporting four circular buckets 10 proximate to the wheelbarrow longitudinal centerline 18.

Each rail 16, 16, 20 has a right angle cross section arranged so that a horizontal leg of each rail acts as a support surface for an associated bucket. The vertical leg of each rail cross-section rigidities the rail. The rear ends of rails 16 are welded, or otherwise joined, to vertical tubular legs 22 that are integral with lifting handles 24. Each tubular leg 22 and associated handle 24 is preferably formed out of a single tube suitably formed to a right angular configuration, as shown in FIG. 2.

The wheelbarrow further comprises two annular bucket confinement rings 30 spaced above the bucket-support platform. Each bucket-confinement ring comprises a central linear tube 32 on the frame longitudinal centerline 18, an outboard linear tube 34 extending parallel to central tube 32, and four semi-circular connector tubes 36 joining the front and rear ends of linear tubes 32 and 34; i.e. two tubes 36 joining the front ends of linear tubes 32 and 34, and two additional tubes 36 joining the rear ends of linear tubes 32 and 34.

In order to position the buckets 10 as close to the frame centerline 18 as possible, a single linear tube 32 is used for both bucket-confinement rings 30. Thus, tube 32 is common to both bucket-confinement rings. However, it will be appreciated that each bucket confinement ring could have its own central linear tube, in which case the central linear tubes would be welded together along the frame centerline.

In the illustrated arrangement, the inner ends of semicircular tubes 36 are ground flat at the points where the tubes join each other and linear tube 32, whereby each bucket-confinement ring has a smooth continuous inner surface presented to the associated buckets.

Each bucket-confinement ring 30 has a tubular crosspiece 38 connecting the linear tubes 32 and 34 midway between the semi-circular connector tubes 36, whereby each ring 30 is subdivided into two compartments for containment of two circular buckets 10.

The ring 30, 30 assembly is supported above the bucket-support platform by a U-shaped support 40 formed out of a single tubular element bent into a U-configuration. The tubular support element comprises two vertical support tubes 42 extending downwardly from linear tubes 34 and a horizontal tube 44 extending between tubes 42, 42 underneath the bucket-support platform. Horizontal tube 44 is welded to rails 16. The upper ends of tubes 42 are welded to linear tubes 34. Tubes 42, 44, 42 are preferably a single tube bent into a configuration.

The ring 30, 30 assembly is further supported by two vertical tubes 46 extending between central linear tube 32 and the bucket-support platform. The lower end of the frontmost tube 46 is welded to horizontal tube 44. The lower end of the rearmost tube 46 is welded to cross rail 20.

Figure 4:
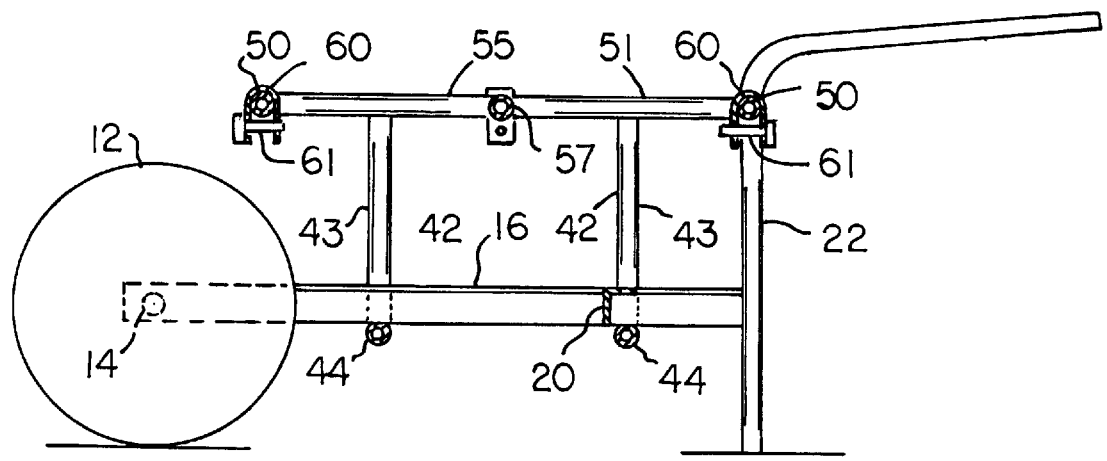
FIG. 4 is a sectional view taken on line 4—4 in FIG. 3.

FIGS. 3 and 4 show a second form that the invention can take. The lower framework for supporting the circular buckets is the same as previously described. Thus, ground wheel 12 has an axle 14 journaled in bearings on the front ends of two divergent longitidual rails 16. A cross rail 20 connects rails 16 near their rear ends, whereby the rails form a bucket-support platform.

The rear ends of rails 16 are joined to vertical tubular legs 22 that extend downwardly from handles 24. A bucket-confinement ring structure 51 is supported above rails 16 by two U-shaped tubes 43. Each tube 43 comprises a horizontal tube section 44 welded to rails 16 and two upstanding tube sections 42 welded to the bucket-confinement ring structure.

The bucket-confinement ring structure comprises a single endless tube 50 bent into a generally square configuration. Corner areas 52 of tube 50 are curved to form ninety degree bends that conform generally to the curvature of buckets 10 that are to be positioned within the ring structure 51. The ring structure is supported by the aforementioned tube sections 42.

A cross-shaped partition structure 55 is removably supported on ring structure 51, to subdivide the ring structure space into four compartments, one for each circular bucket. Partition structure 55 comprises a transverse tube 57 and two longitudinal tubes 58 welded together, to form a cross-shaped partition. The outer end of each tube (57 or 58) is welded to a U-shaped strap 60 that is sized to fit over tube 50 (that forms ring structure 51). A pin 61 is extended through aligned holes in each U-shaped strap to retain the partition structure 55 on ring structure 51. A nut (not shown) can be threaded onto each pin 61, to prevent the pin from dropping out of the aligned holes in each associated strap 60.

The cross-shaped partition structure 55 is adapted for easy removal from ring structure 51 (by removing pins 61 from straps 60). With the partition structure removed from ring structure 51, the ring structure can be used to support other attachments, such as a tray (not shown in FIGS. 3 or 4).

Figure 5:
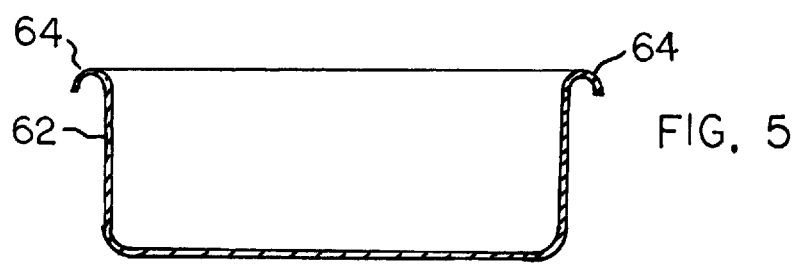
FIG. 5 is a sectional view taken through a removable tray adapted for positionment on the FIG. 3 wheelbarrow.

FIG. 5 shows a tray 62 adapted to be supported on the ring structure 51 (after removal of the cross-shaped partition). As shown, the tray has a peripheral lip structure 64 adapted to fit over ring structure 51, whereby the tray becomes part of the wheelbarrow. The bottom wall of the tray can be supported by rails 16, whereby the tray is adapted to contain heavy loads, e.g. dirt or uncured cement.

The illustrated wheelbarrow provides a relatively strong structure that is, at the same time, attractive and ornamental. The tubular frame elements give the wheelbarrow a pleasing ornamental appearance.

What is claimed:

1. A wheelbarrow comprising a frame having a front end, a rear end, a single ground wheel at the frame front end, and a pair of lifting handles extending from the frame rear end; said frame having a longitudinal centerline containing said ground wheel;

said frame comprising a bucket-support platform that includes two longitudinal rails that diverge away from the frame centerline in a front-to-rear direction, and a cross rail connecting said longitudinal rails a significant distance behind said ground wheel; said ground wheel having an axle supported by the front end portions of said divergent rails;

said frame further comprising two annular bucket-confinement rings spaced above said platform in a common plane; each bucket-confinement ring comprising a central linear tube on the frame longitudinal centerline, an outboard linear tube extending parallel to said central linear tube, and two semi-circular connector tubes joining the front and rear ends of said linear tubes.

2. The wheelbarrow of claim 1, wherein said central tube is common to the two bucket-confinement rings.

3. The wheelbarrow of claim 1, and further comprising a U-shaped support means connecting said bucket-support platform to said annular bucket-confinement rings; said U-shaped support means comprising two vertical support elements extending downwardly from said outboard linear tubes and a horizontal support element underlying the bucket-support platform.

4. The wheelbarrow of claim 4, wherein said U-shaped support means comprises a single U-shaped support tube.

5. The wheelbarrow of claim 1, wherein the rails of said bucket-support platform are angle cross section bars arranged with legs thereof in a common horizontal plane for the associated buckets.

6. The wheelbarrow of claim 1, wherein each said bucket-confinement ring includes a cross-piece connecting the central linear tube to the outboard linear tube midway between the semi-circular connector tubes.

7. A wheelbarrow comprising a bucket-support platform having a front end and a rear end; a single ground wheel supported at the front end of said platform, said ground wheel being located in a central plane that defines the wheelbarrow longitudinal axis; a bucket-confinement ring structure located above said platform; and means subdividing said ring structure into four bucket-containment compartments located alongside said longitudinal axis behind said ground wheel; said bucket-confinement ring structure having a square plan configuration; said subdividing means comprising a cross-shaped partition attached to said ring structure; said partition comprising a first tube on the wheelbarrow longitudinal axis, and a second tube extending transverse to the wheelbarrow longitudinal axis.

8. The wheelbarrow of claim 7, wherein said partition is removably secured to said ring structure.

9. The wheelbarrow of claim 8, and further comprising U-shaped connectors on the ends of said first and second tubes; said U-shaped connectors being adapted to partially encircle the surfaces of said ring structure for locking the partition to the ring structure.

* * * * *